United States Patent [19]

Axnäs

[11] Patent Number: 5,202,030

[45] Date of Patent: Apr. 13, 1993

[54] METHOD FOR REMOVING ORGANIC CONTAMINANTS FROM ACIDIC AQUEOUS EFFLUENT

[75] Inventor: Anders Axnäs, Bromma, Sweden

[73] Assignee: Solvator Process AB, Bromma, Sweden

[21] Appl. No.: 784,443

[22] PCT Filed: May 8, 1990

[86] PCT No.: PCT/SE90/00300

§ 371 Date: Nov. 8, 1991

§ 102(e) Date: Nov. 8, 1991

[87] PCT Pub. No.: WO90/13518

PCT Pub. Date: Nov. 15, 1990

[30] Foreign Application Priority Data

May 9, 1989 [SE] Sweden .................. 8901646

[51] Int. Cl.⁵ .................................. C02F 1/52
[52] U.S. Cl. ......................... 210/695; 210/717; 210/722; 210/724; 210/726; 210/769; 210/928
[58] Field of Search ............... 210/695, 710, 717, 721, 210/722, 724, 726, 769, 928

[56] References Cited

U.S. PATENT DOCUMENTS

| | | | |
|---|---|---|---|
| 360,126 | 3/1887 | Tweeddale | 210/722 |
| 1,254,009 | 1/1918 | Hughes et al. | 210/721 |
| 3,575,853 | 4/1971 | Gaughan et al. | 210/667 |
| 3,931,007 | 1/1976 | Sugano et al. | 210/717 |
| 5,013,453 | 5/1991 | Walker | 210/721 |
| 5,045,214 | 9/1991 | Walker | 210/717 |
| 5,068,038 | 11/1991 | Fischer et al. | 210/724 |

FOREIGN PATENT DOCUMENTS

| | | | |
|---|---|---|---|
| 725879 | 10/1942 | Fed. Rep. of Germany. | |
| 20401 | 9/1972 | Japan | 210/928 |
| 146160 | 5/1974 | Japan | 210/928 |
| 89893 | 7/1981 | Japan | 210/695 |
| 168588 | 9/1985 | Japan | 210/695 |
| 418337 | 10/1934 | United Kingdom | 210/722 |

*Primary Examiner*—Matthew O. Savage
*Attorney, Agent, or Firm*—Burns, Doane, Swecker & Mathis

[57] ABSTRACT

A process for the purification of acid aqueous effluent contaminated with organic material is disclosed herein. The method includes the steps of: a) bringing the aqueous effluent in contact with an iron-containing material in particulate form, wherein the particles of iron are in the metallic state; b) subjecting the material to mechanical processing in contact with the aqueous effluent while dissolving at least part of the metallic iron; c) increasing the pH of the aqueous effluent after the mechanical processing step to an essentially neutral pH; d) causing precipitation of three-valent iron under oxidizing conditions; and e) separating the precipitate from aqueous phase of step d).

16 Claims, 1 Drawing Sheet

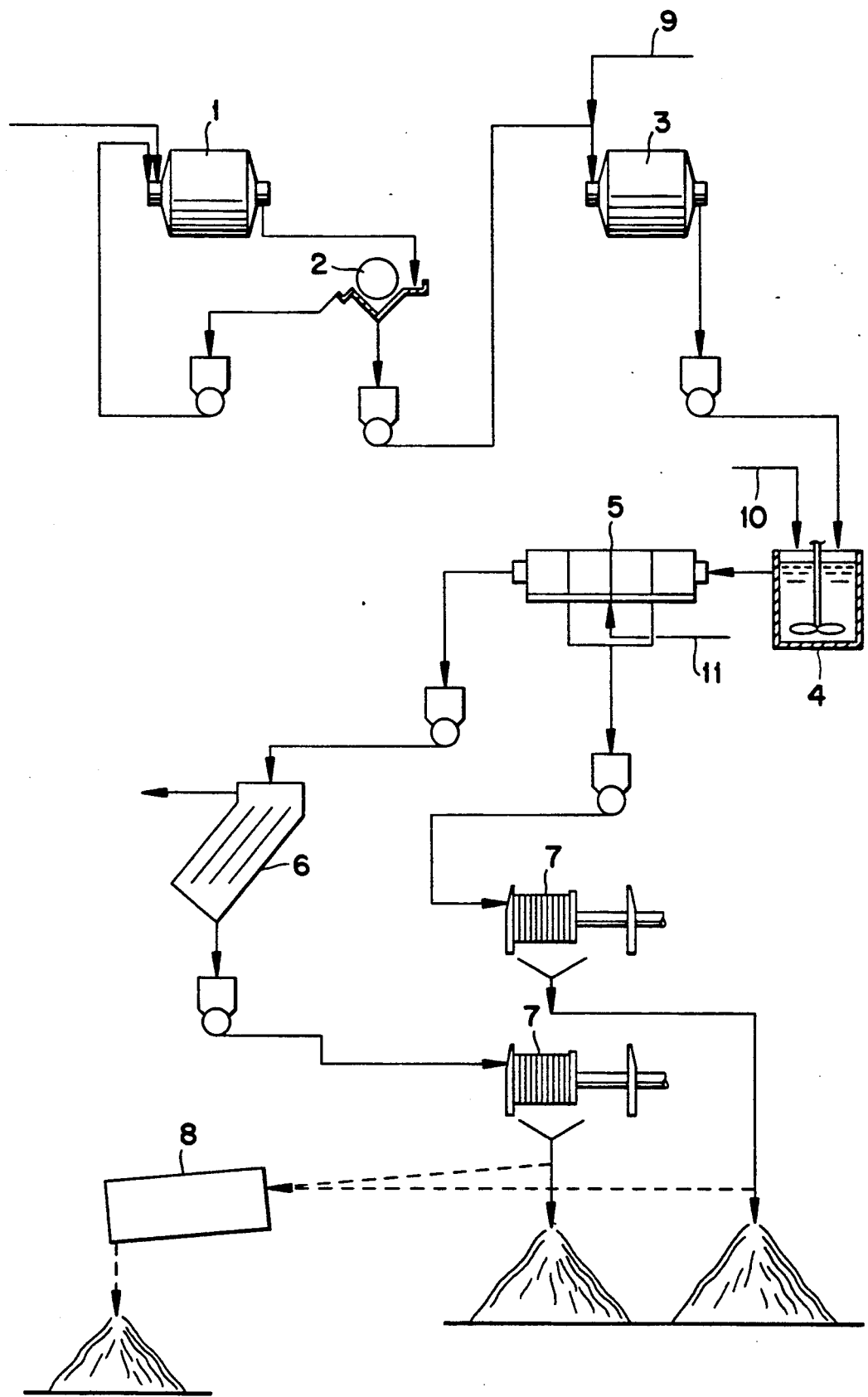

METHOD FOR REMOVING ORGANIC CONTAMINANTS FROM ACIDIC AQUEOUS EFFLUENT

The present invention relates to a process for the purification of sewage water which is contaminated with organic materials and which has a pH lower than neutral. The invention is particularly directed to the purification of industrial effluents from pulp bleaching, particularly chlorine/chlorinedioxide bleaching of chemical pulp.

Industrial effluents of this type are presently purified only insufficiently, whereby the recipients used are subjected to large loads with concomitant ecologic problems. To the extent that the requirements of the environment have been increased the need for effective purification processes therefore arise, and such processes must also be acceptable from an economic point of view. Presently satisfactory purification processes for industrial effluents are needed, particularly for effluents orginating from the bleaching of chemical pulp.

The present invention has for its object to provide a simple and effective process for the purification of such industrial water effluents. Another object is to provide a process which is acceptable from an economic point of view but also results in a highly effective purification so as to reduce the load on the recipient to a minimum.

For these and other objects which will be clear from the following description the present invention provides a purification process for acid aqueous effluents, said process comprising the steps of:

a) bringing the aqueous effluent in contact with an iron-containing material in particulate form, wherein the iron at least partially is present in a metallic state;

b) subjecting said material to abrasive mechanic processing in contact with the aqueous effluent while dissolving at least part of the metallic iron;

c) increasing the pH of the aqueous effluent after said mechanical processing to an essentially neutral pH;

d) causing precipitation of three-valent iron under oxidizing conditions; and e) separating the precipitate from d) from the aqueous phase.

It is preferred in the above-defined step a) to introduce also magnetite in particulate form whereby better mechanical processing and better precipitation will be obtained.

The pH-adjustment carried out in step c) above is suitably performed in two stages with a first addition of limestone, i.e. unburnt lime, particulate form with mechanical treatment, and then in a second stage this pH will be further increased by adding a strong base. The strong base can be sodium hydroxide, potassium hydroxide or another suitable base. In this neutralization in two stages the pH-adjustment in the first stage is suitably to a pH of from about 5.5 to about 6.5, such as about 6.0, and in stage two the pH is further increased to an interval lying within the range about 7 to about 8, for example about 7.5.

Before precipitating three-valent iron under oxidizing conditions according to step d) above it is preferred to perform magnetic precipitation of the excess of metallic iron and, optionally the excess of magnetite, and this excess is suitably returned to step a) of the process.

The oxidizing conditions in step d) can be provided by a suitable oxidant, and it is preferred to use air, optionally enriched in oxygen, or hydrogenperoxide.

The abrasive mechanical processing of solid materials in contact with the aqueous effluent that shall be purified is suitably carried out in some sort of grinding mill. It is particularly preferred to use a ballmill operating with iron or steel balls as grinding bodies. During the abrasive mechanical processing that is carried out in such mill the grinding bodies cause the formation of iron ions in that the acid effluent dissolves iron from the grinding bodies in connection with the processing. Generally, the aqueous effluent in which the abrasive mechanical processing takes place has a pH of less than about 3.

The invention will in the following be further described by non-limiting embodiments in conjunction with the appended drawing which shows a diagrammatic sketch in the form of a flow sheet on a preferred industrial process for the purification of an aqueous effluent from the bleaching of chemical pulp.

The effluent referred to in the following specific examples originates from the bleaching of pine sulphate pulp having a kappa number of about 30, said pulp being bleached according to the sequence oxygen gas(O)-(chlorine+chlorinedioxide)-($C_{85}$+$D_{15}$)-alkali extraction($E_1$)-chlorinedioxide($D_1$)-alkali extractions($E_2$)-chlorinedioxide($D_2$). Thus, the sequence is O-($C_{85}$+$D_{15}$)-$E_1$-$D_1$-$E_2$-$D_2$.

The acid effluents from the steps are admixed as well as the effluents of the alkaline steps. These two effluents are thus mixed at the site of release. The flows from the acid of the alkaline steps are 20 $m^3$ per ton pulp and 5 $m^3$ per ton pulp, respectively. The mixed bleach effluent has a pH of 2.1–2.2. The purification procedure according to the invention starts from such acid water effluent.

BRIEF DESCRIPTION OF THE DRAWING

The present invention will be more readily understood by reference to the drawing which schematically illustrates a waste water treatment system embodying features of the invention.

DETAILED DESCRIPTION OF THE INVENTION

The apparatus used comprises cylindric ball mills 1,3 made of iron and having the dimensions length 30 cm, inner diameter 20 cm, corresponding to a volume of 9.4 l. The ball mill 1 is operated at a rotational speed of 67 revolutions per minute, whereas the identical ball mill 3 is operated at a rotational speed of 77 revolutions per minute. Device 2 is a magnet separator, wherein excess iron and magnetite are separated and recirculated to the process. Limestone in particulate form is added via line 9 to a ball mill 3. In a mixing vessel 4 strong base or alkali is supplied via line 10 for example sodium hydroxide for increasing the pH before entering flotation cells 5, where oxidation of the iron from $Fe^{2+}$ to $Fe^{3+}$ takes place by the supply of air via line 11, which results in precipitation of iron hydroxide while co-precipitation of the organic material takes place in the effluent. The precipitate formed is separated in lamellae thickeners 6 and filtration takes place in suitable filters 7 that may be constituted by press filters, band filters or drum filters. The solid material precipitated and separated may either be deposited or may be destructed in a special destruction furnace 8. Alternatively the separated solid materials are supplied to a blast furnace for complete destruction while utilizing the iron present therein. Between devices 5 and 6 there may be added a mixing vessel for the supply of precipitating and flocculating agents.

CHEMICALS USED

In ball mills 1,3 the iron balls contained therein have a size of about 3 g per ball. As magnetite there is used finely ground magnetite powder, and the limestone is dolomite particulate form. As a strong base there is used sodium hydroxide, 1-molar (Labasco purum). The coagulation agent is CDM 1597 50% and the flocculation agent is constituted by CDM 333, 0.5%, Magnafloc ®, non-ionic.

The present invention is based on the principle that acid effluents dissolve iron in the mechanical processing in the mill and this dissolution takes place with the formation of hydrogen gas and increase of pH. The dissolved iron forms complexes with organic substances found in the effluent, and the excess of dissolved iron in two-valent form is precipitated by the adjustment of pH using limestone and alkali to form iron(II)hydroxide. By neutralization to a pH of about 7.5 and oxidation with air two-valent iron is converted to three-valent iron which precipitates as FeO(OH). The precipitation process is facilitated by the addition of coagulation agent and flocculation agent and compact and large flocks are formed which are rapidly deposited on the bottom of the vessel used. Flocks can be effectively separated in thickeners and de-watered in a suitable device, for example a band filter, and can then be destroyed for example in a blast furnace, suitably after briquetting or pelleting of the precipitated material. By using the techniques of the present invention there will be obtained a purification degree with regard to the water effluent of about 85% based on organic bound chlorine and about 65% based on COD (Chemical Oxygen Demand). Remaining dissolved iron in the water is only about 1 mg per liter. Aromatic chloro compounds, such as polychlorinated phenols, cannot be detected at all in the purified effluent.

EXAMPLE 1

2 l of bleaching effluent having a pH of about 2.15 are added to mill 1 containing 15.3 kg iron balls. Then 16 g of magnetite are added. The mill is rotated for 15 sec., the pH increasing to about 3.8. The treated effluent is transferred to mill 3 containing 4.3 kg of limestone. This mill is rotated for 3 min., pH increasing to about 5.85. 1 l of water is withdrawn from mill 3 and transferred to mixer 4, wherein the pH is adjusted to about 7.5 using NaOH (15 ml). The water is then oxidized with air for 3 min. and transferred to a 2 l beaker.

In this beaker there is added 1 drop (0.05 ml) of coagulation agent with cautious stirring. This results in the formation of a course grained precipitate. Then there is added 1 drop (0.05 ml) of non-ionic Magnafloc ® with somewhat more intense stirring. The precipitate is quite quickly formed and sinks to the bottom within a few minutes. The clear water is analyzed, as is the precipitate.

EXAMPLE 2

A 1 l measuring glass is filled with the effluent treated according to Example 1. Precipitation is carried out in the same manner as in Example 1 but the stirring used therein is replaced with a procedure consisting in turning the measuring glass up-side-down repeatedly. After 15 min. the precipitate has deposited in the lower part of the measuring glass and takes a volume of about 50 ml (5%). The water above the precipitate is clear.

Below the principles of analysis carried out are briefly presented.

CHLOROORGANIC SUBSTANCE

Analysis using the AOX-method according to SCAN-W 9:89.

The water is filtrated and activated carbon is added, stirring takes place and the water is filtered off. The carbon is burned in a quartz furnace and the HCl-gas formed is determined by coulometric titration.

COD (CHEMICAL OXYGEN DEMAND)

This is a measure of the quantity of organic substance in the water. COD is determined colorimetrically by the addition of bichromate sulphuric acid. Organic materials are oxidized to carbondioxide and water. The reaction $Co^{6+} \rightarrow Co^{3+}$ is determined.

CHLOROPHENOLS

These are determined by gas chromatography.

IRON

Dissolved iron is determined using AAS atom absorption spektrophotometri.

CHLORIDE

The quantity of chloride is determined using iron chromatography.

CHLORATE

This is determined using ion chromatography.

RESULTS

The appended Table 1 shows the results of analysis made on treated and untreated samples of water effluents and the degree of purification in percent. The values averages of three determinations. The reproducability of the precipitation tests is very good. The process according to the invention has been repeated many of times without noticable disturbances.

The precipitate has a dry solids content of 3-5 g per liter depending on the quantity of magnetite that has been entrained in the water.

TABLE 1

Results of analysis on untreated and treated samples and degree of purification in percent.

| Sample | AOX | COD | Chlorophenols mg/l | $Fe^{3+}$ | $Cl^-$ | $ClO_3$ |
|---|---|---|---|---|---|---|
| Untreated | 110 | 606 | 0,15 | — | 107 | 123 |
| Treated | 17 | 215 | —*) | 1 | 105 | 120 |
| Reduction % | 85 | 65 | >99 | — | 0 | 0 |

*)not detected

I claim:

1. A process for removing organic materials from acidic aqueous effluents contaminated with organic materials, said effluents having a pH of less than about 3, consisting essentially of:
   (a) bringing the aqueous effluent containing organic contamination in contact with a source of iron-containing material in particulate form, wherein said source of iron includes particles of iron in the metallic state;

(b) subjecting said material to abrasive mechanical processing in contact with the aqueous effluent while dissolving at least part of the metallic iron and forming a complex between dissolved metallic-iron and said organic contamination;

(c) increasing the pH of the aqueous effluent in two stages after said mechanical processing to an essentially neutral pH wherein limestone is added in the first stage and a strong base is added in the second stage;

(d) causing precipitation of three-valent iron together with said organic contamination under oxidizing conditions after completion of step (c); and (e) separating the precipitate formed in step (d) from the aqueous phase.

2. A process according to claim 1, wherein particulate magnetite additionally is contacted with said aqueous effluent in step (a).

3. A process according to claim 2, wherein the magnetic precipitation of undissolved metallic iron is performed before step (c), with said excess iron being recirculated into the aqueous effluent at step (a) of the process.

4. A process according to claim 2, wherein the oxidizing conditions of step (d) are provided through the supply of air.

5. A process according to claim 2, wherein said abrasive mechanical processing of step (b) is carried out in a grinding mill.

6. A process according to claim 1, wherein the pH-adjustment of step (c) in the first stage is raised to a pH of from about 5.5 to about 6.5 and in the second stage to a pH of about 7 to about 8.

7. A process according to claim 6, wherein the limestone is added to the aqueous effluent in the first stage of step (c) while in particulate form.

8. A process according to claim 1, wherein the limestone is added to the aqueous effluent in the first stage of step (c) while in particulate form.

9. A process according to claim 1, wherein the magnetic precipitation of undissolved metallic iron is performed before step (c), with said excess iron being recirculated into the aqueous effluent at step (a) of the process.

10. A process according to claim 1, wherein the oxidizing conditions of step (d) are provided through the supply of air.

11. A process according to claim 1, wherein said abrasive mechanical processing of step (b) is carried out in a grinding mill.

12. A process according to claim 11, wherein said mill is a ball mill operating with iron or steel balls as grinding bodies, said balls acting as said particles of iron in the metallic state.

13. A process according to claim 12, wherein said contaminated aqueous effluent originated during the bleaching of pulp formed by chemical means.

14. A process according to claim 1, wherein said contaminated aqueous effluent originated during the bleaching of pulp formed by chemical means.

15. A process according to claim 14, wherein said contaminated aqueous effluent originated from the chlorine or chlorinedioxide bleaching of pulp formed by chemical means.

16. A process according to claim 1, wherein the precipitate resulting from step (e) is destroyed by subjection to the action of a blast furnace.

* * * * *